April 11, 1967 L. SEGUIN 3,313,982
MAGNETIC CURRENT ZERO SENSING CIRCUIT
Filed March 22, 1965 2 Sheets-Sheet 1
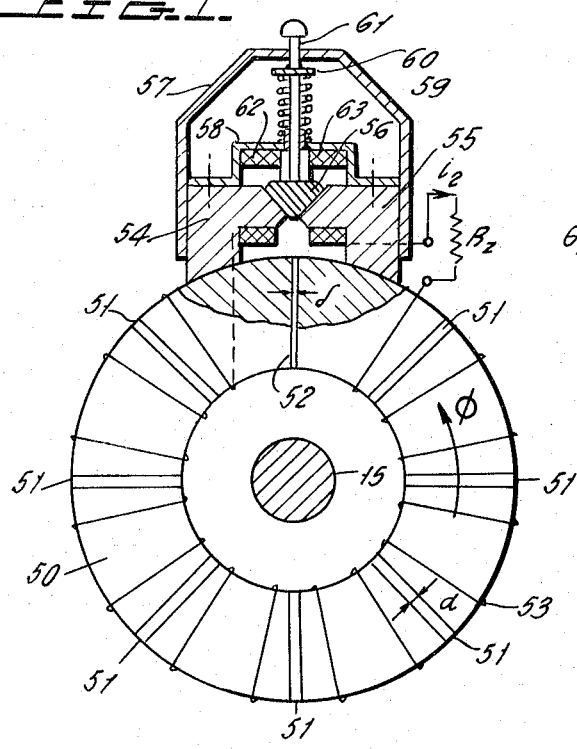
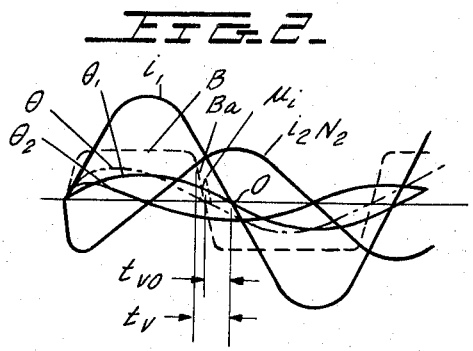
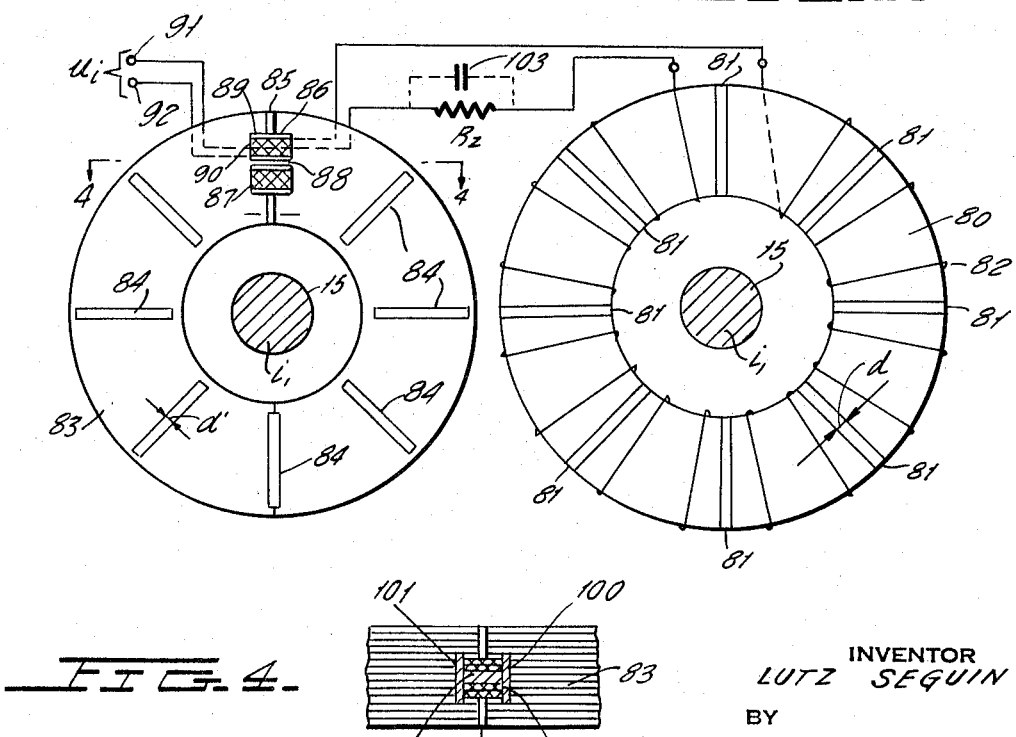
INVENTOR
LUTZ SEGUIN
BY
OSTROLENK, FABER, GERB & SOFFEN
ATTORNEYS April 11, 1967 L. SEGUIN 3,313,982
MAGNETIC CURRENT ZERO SENSING CIRCUIT
Filed March 22, 1965 2 Sheets-Sheet 2
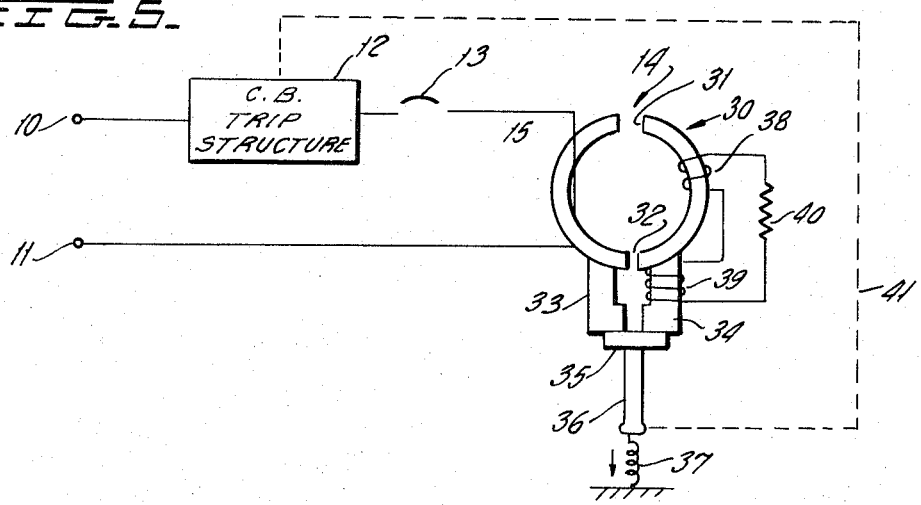
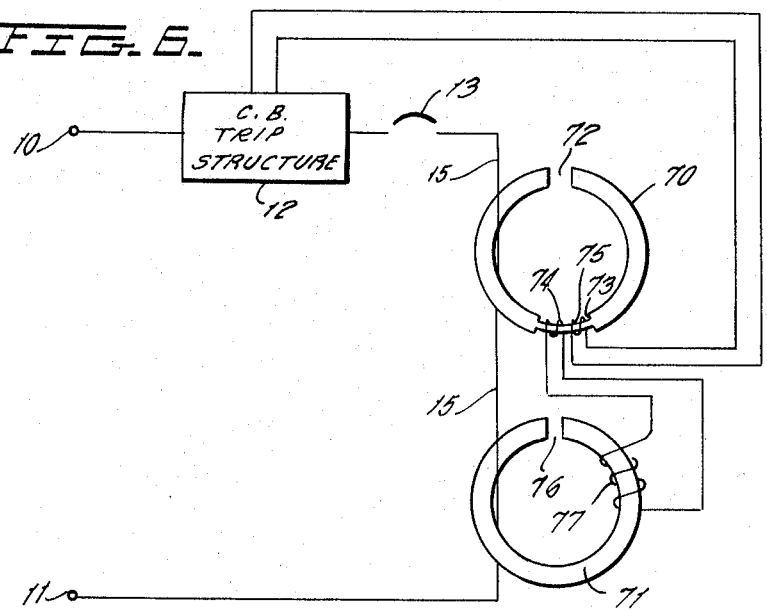
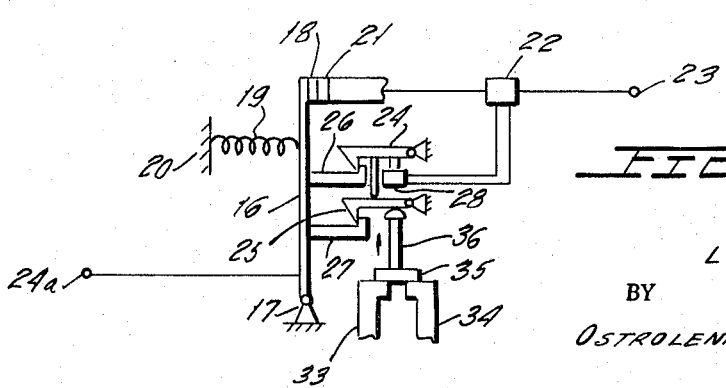
INVENTOR.
LUTZ SEGUIN
BY
OSTROLENK, FABER, GERB & SOFFEN
ATTORNEYS United States Patent Office 3,313,982
Patented Apr. 11, 1967

3,313,982
MAGNETIC CURRENT ZERO SENSING
CIRCUIT
Lutz Seguin, Hamburg, Germany, assignor to I-T-E Circuit Breaker Company, Philadelphia, Pa., a corporation of Pennsylvania
Filed Mar. 22, 1965, Ser. No. 441,616
Claims priority, application Germany, Mar. 23, 1964, S 90,153
11 Claims. (Cl. 317—11)

This invention relates to a novel circuit for anticipating the presence of a current zero for current flowing through a circuit and for delivering a mechanical or electrical signal to a suitable operating mechanism which will permit the separation of a pair of circuit breaker contacts prior to the passage of current in the line through its zero value.

Circuit breakers of the type which interrupt current in a line when the current in the line is at zero current magnitude, or just prior to the zero current magnitude, are well known to the art, and are generally termed "synchronous" circuit breakers. It is necessary in such a device to provide means for measuring the line current and for delivering a circuit breaker operating impulse to the circuit breaker or switch releasing mechanism just prior to zero current in the line being protected.

The principle of the present invention is to provide a novel magnetic circuit which is magnetically coupled to the line being protected, and is arranged to deliver a mechanical or electrical operating signal to the switch or circuit breaker releasing mechanism at some time just prior to a current zero in the line being protected.

In particular, the novel structure of the invention requires relatively small power for its operation, and does not contain the usual difficulties found in current transformers due to unavoidable saturation phenomena which result in distortion. Moreover, the device draws considerably less energy from the circuit than would an equivalent shunt arrangement, and provides sufficient output power to eliminate the need for further electronic processing of the output signal.

Accordingly, a primary object of this invention is to provide a novel magnetic circuit arrangement for generating an output signal just prior to the presence of a zero current magnitude in a line coupled to the magnetic device.

Another object of this invention is to provide a novel signal generating circuit for generating a signal prior to current zero in a circuit which is to be interrupted which is unaffected by the usual saturation phenomena occurring in current transformers; which requires relatively little input energy; which provides a sufficiently high power level to eliminate the need for further electronic processing; and which is substantially unaffected by external fields.

These and other objects of this invention will become apparent from the following description when taken in connection with the drawings, in which:

FIGURE 1 is a partial cross-sectional view of the magnetic system of the invention.

FIGURE 2 is a curve of magnetomotive force, flux and current as plotted against time for various portions of the magnetic and electrical circuit of FIGURE 1.

FIGURE 3 shows a second embodiment of the invention.

FIGURE 4 is a cross-sectional view of the portion of FIGURE 3 within the line 4—4, and further illustrates the placement of windings on a magnetic bobbin.

FIGURE 5 schematically illustrates the magnetic circuit of FIGURE 1.

FIGURE 6 schematically illustrates the magnetic circuit of FIGURE 3.

FIGURE 7 schematically illustrates a typical circuit breaker arrangement which can utilize the magnetic system of the present invention.

Referring first to FIGURES 5 and 7, there is schematically illustrated therein the novel magnetic system of the present invention (FIGURE 5) in combination with a circuit breaker (FIGURE 7) which can utilize the system of FIGURE 5.

FIGURE 5 schematically illustrates an A.-C. line terminating at terminals 10 and 11 which can be a single phase line or could be one phase of a multiphase system. The terminal 10 is then connected to a schematically illustrated circuit breaker trip structure 12 which is in series with the circuit breaker contacts 13. The line is then taken through a magnetic core 14 and back to a terminal 11. The conductor portion extending through core 14 is indicated as conductor portion 15.

The circuit breaker trip structure 12 and its contacts 13 are further schematically illustrated in FIGURE 7 wherein the contacts comprise a contact arm 16 pivotally mounted at fixed pivot 17 and terminating in a main movable contact 18. A biasing spring 19 having a fixed end at the fixed point 20 is then connected to the contact arm 16 and biases the contact arm 16 for movement in a counterclockwise direction about pivot 17.

The movable contact 18 then cooperates with a fixed contact 21 wherein the fixed contact 21 is connected through a suitable fault sensing means 22 to a terminal 23. A second terminal 24a is connected to the contact arm 16.

The pivotally mounted contact arm 16 is then held in the position shown against the force of the biasing or opening spring 19 by the schematically illustrated latch arrangement which includes pivotally mounted rotatable latches 24 and 25 which normally engage cooperating latchable elements 26 and 27 extending from contact arm 16.

The latch 24 is equivalent to the normally used latch of any circuit breaker, and is released, for example, by the actuation of a plunger of solenoid 28 which is energized responsive to predetermined fault conditions as measured by the fault sensor 22.

In order to now convert the device of FIGURE 7 to a synchronous type of circuit breaker, the second latch 25 is added thereto which is released only when the fault current flowing through contacts 18 and 21 is just about to pass through a current zero value. Thus, the latch 24 is released at any arbitrary time after the appearance of a fault in the system, while the second latch 25 is released only when this fault current is just about to pass through a zero current value.

FIGURES 5 and 7 illustrate one form of a releasing mechanism for releasing the latch 25 just prior to a current zero. Thus, in FIGURES 5 and 7, a magnetic core 30 is provided which has, in effect, a large air gap 31 and a small air gap 32. First and second magnetic poles 33 and 34 then extend from the core 30 on opposite sides of the relatively small gap 32 and receive a magnetic armature 35 at the ends thereof. Magnetic armature 35 then has a mechanical plunger 36 connected thereto which is normally biased away from the pole shoes 33 and 34 as by a biasing spring 37.

A winding 38 on magnetic core 30 is then connected in series with a winding 39 in the magnetic circuit which includes pole shoes 33, 34, armature 35 and gap 32 with a series connected resistor 40 being placed in the circuit.

The plunger 36 is then illustrated in FIGURE 5 as operatively connected, by the dotted line 41, to the circuit breaker trip structure 12. This is shown in more detail in FIGURE 7 where it is seen that the plunger 36 can move into engagement with latch 25 to remove the latch 25 when armature 35 is released.

In general, the operation of the system of FIGURE 5 is such that when there is fault current flowing in conductor 15, it establishes a flux of substantial value in core 30. The magnetomotive force across the gap 32 is relatively small because of the relatively large gap 14 with this magnetomotive force being in phase with the current in conductor 15.

At the same time, a voltage is induced in winding 38, thus causing a current to flow in winding 39 limited by the resistance of resistor 40 and the remaining resistance of the circuit components. This current will establish a further magnetomotive force in the circuit including air gap 32, pole shoes 33 and 34, and armature 35.

As will be described more fully hereinafter, the magnetomotive forces caused by the circulating flux through gap 32 and that due to winding 39 will be related to one another in such a manner as to cause the flux through armature 35 to begin to reverse from a substantially saturated condition toward an oppositely saturated condition at a time just prior to the existence of a current zero in conductor 15. Thus, prior to a current zero, the spring force of the biasing spring 37 becomes sufficient to move armature 35 away from pole shoes 33 and 34, thereby to actuate the circuit breaker trip structure 12 of FIGURE 5 (as by removing latch 25 in FIGURE 7). Therefore, the circuit breaker contacts will release after the existence of a fault condition and just prior to a current zero value.

FIGURE 1 illustrates a specific manner in which the schematically illustrated magnetic circuit of FIGURE 5 can be arranged. More particularly, FIGURE 1 illustrates a magnetic core 50 which has a plurality of equal air gaps 51 disposed therearound, each having a spacing $d$ along with a further air gap 52 having a spacing $\delta$. Clearly, the total air gap of the gaps 51 is equivalent to gap 31 of FIGURE 5, while the smaller air gap 52 is equivalent to air gap 32 of FIGURE 5. Thus, the magnetic core 50 of FIGURE 1 will have a total air gap $nd+\delta$, where $n$ is the number of identical air gaps 51 with the total air gaps selected such that there will be no saturation of the magnetic circuit in the region of the synchronous release time, as will be described more fully hereinafter.

The magnetic circuit 50 is then surrounded by a toroidal winding 53 which is equivalent to winding 38 of FIGURE 5. It will be further noted that the conductor 15 which carries a current $i_1$ passes through the center of core 50, as also shown in FIGURE 5. It is the current through this conductor 15 which is to be interrupted, as has been described in FIGURE 5.

A pair of magnetic pole shoes 54 and 55 then straddle the air gap 52 and define a triangularly shaped air gap which receives the triangular armature 56 which is equivalent to armature 35 in FIGURE 5.

A non-magnetic housing 57 then encloses the pole shoes 54 and 55 in armature 56 and includes a bridging member 58 which serves as a platform for the bottom of biasing spring 59 which bears against a washer 60 secured to the plunger 61 connected to armature 56. Clearly, the plunger 61 is equivalent to plunger 36 of FIGURE 5.

Two winding sections 62 and 63 are then wound on pole shoes 54 and 55, respectively, and correspond to the winding 39 schematically illustrated in FIGURE 5. These two windings are then connected in series with one another and form a closed series connection through resistor $R_Z$ with the winding 53 thus defining a circuit similar to that shown in FIGURE 5.

The operation of the magnetic system of FIGURE 1 is best understood by reference to FIGURE 2. Thus, FIGURE 2 illustrates the magnetomotive force $\theta_1$ which is the magnetomotive force appearing across gap 52. This magnetomotive force is given by $$\theta_1 \approx \frac{\delta}{nd} \times i_1$$

The total flux $\phi$ circulating in core 50 further induces a voltage in winding 53 which is given by $$e = -\frac{d\phi}{dt} \cdot N_2$$

where $N_2$ is the number of turns of winding 53.

If the total resistance of the circuit, including winding 53, resistor $R_Z$ is large when compared to the inductive reactance $\omega L$, where $L$ is the inductance of the circuit, then the secondary current $i_2$ induced in the closed circuit will be $$i_2 = \frac{d\phi}{dt} \cdot \frac{N_2}{R}$$

Thus, a second magnetomotive force is created in the magnetic circuit including pole shoes 54 and 55 and armature 56 which is shown in FIGURE 2 as $\theta_2$ where $$\theta_2 = i_2 \cdot N_Z$$

where $N_Z$ is the total number of turns of windings 62 and 63.

Referring now specifically to FIGURE 2, the primary current $i_1$ and the magnetomotive force $\theta_1$, which is in phase therewith, are shown along with the magnetomotive force $\theta_2$. The total magnetomotive force given by $\theta_1+\theta_2$ will result in the total magnetomotive force $\theta$, shown in the dot-dash line in FIGURE 2. It will be seen that this total magnetomotive force passes through zero at a time $t_{V0}$ prior to the passage of current $i_1$ through zero.

FIGURE 2 further illustrates in dotted lines the magnetic induction B in armature 56 induced by this magnetomotive force. More particularly, and as illustrated in FIGURE 2, the armature 56 is so arranged as to be normally saturated during the major portion of the current-carrying cycle and becomes unsaturated just prior to the time interval $t_V$ prior to current 0.

It should be further noted that at the beginning of interval $t_V$, the induction value $B_a$ is reached which is the value of induction which gives a magnetomotive force just equal and opposite to the biasing force of spring 59. Thus, when the induction in armature 56 decreases below the value $B_a$, the spring 59 will move the armature 56 away from poles 54 and will move plunger 61 upwardly.

In summary, the operation of the system is such that at a time $t_{V0}$ before the occurrence of zero current for current $i_1$, the resulting magnetomotive force and thus armature induction B will pass through zero. At the time $t_V$ just prior to this zero passage, the dropout induction value $B_a$ for armature 56 is reached so that the armature 56 is released by the opposing spring force of spring 59. Thus, this effects the release of the circuit breaker contacts as, for example, shown in FIGURE 7 where the plunger removes the last latch so that the circuit breaker contacts carrying current $i$ will open immediately prior to the current zero value.

After this interval has passed, it will be noted that in each half-cycle the flux of armature 56 reverses. It should be further noted that under normal current carrying conditions (conditions other than fault current conditions) the magnetomotive forces generated in the magnetic circuit including pole pieces 54 and 55 are too small to seal armature 56. That is to say, normally, the total induction of armature 56 is less than the value $B_a$. Therefore, the armature 56 is normally open so that no chatter will result.

Preferably, the magnetic circuit is so constructed that the magnetic cross-section of armature 56 will be approximately 10% of the total magnetic cross-section of core 50, thereby to insure the saturation of armature 56 during the major portion of the current cycle.

Moreover, and in order to avoid sticking of armature 56 to the pole pieces 54 and 55, it has been found useful to provide small intentional air gaps of the order of 0.02 millimeter between pole shoes 54 and 55 in armature 56.

While this somewhat reduces the slope of the decreasing induction portion of FIGURE 2, the avoidance of sticking renders the complete device more reliable. Moreover, it has been found useful to dispose the entire armature arrangement within the magnetic circuit of core 50 thereby to eliminate the magnetic influence of currents in neighboring phases on the magnetic system of the phase in question.

The secondary ampere turns generated in winding 53 have also been found to generate a magnetomotive force which lags the current $i_1$ by about 90°, thereby producing a slight additional phase shift in the total magnetomotive force $\theta$ of FIGURE 2 which somewhat decreases the total pre-release time $t_{v0}$. This can be eliminated by using a separate air gap transformer to produce the current $i_2$, as will be described more fully hereinafter with reference to FIGURES 3 and 6.

FIGURE 6 more specifically illustrates a second embodiment of the invention wherein an electrical trip signal is generated as contrasted to the mechanical trip signal of FIGURES 1 and 5, and moreover where the secondary ampere turns $i_2$ of FIGURE 1 are generated in an independent magnetic source. The system of FIGURE 6 includes the circuit breaker trip structure 12 and circuit breaker 13 of FIGURE 5 which are connected between terminals 10 and 11. In FIGURE 6, however, the magnetic signal generating system includes two magnetic cores 70 and 71, which each receive the conductor 15. The core 70 is then provided with a relatively large air gap 72 (equivalent to air gap 31 of FIGURE 5) and a reduced magnetic core section 73 which carries insulated windings 74 and 75. The second core 71 then similarly has a large air gap 76 therein equivalent to air gap 31 of FIGURE 5, and has wound thereon the winding 77 which is equivalent to winding 38 of FIGURE 5.

In operation, a small percentage of the total magnetomotive force of core 70 created by the flux generated by conductor 15 appears across the restricted magnetic section 73, being equivalent to the magnetomotive force $\theta_1$ of FIGURE 2. A second magnetomotive force is created by the current in the winding 74, which current is produced by the voltage across the winding 77. This voltage is generated in the winding 77 by the flux of core 71. This second magnetomotive force is equivalent to the magnetomotive force $\theta_2$ of FIGURE 2. An output voltage is then induced in winding 75 due to the effective net magnetomotive force across the restricted magnetic section 73, whereby the net effective magnetomotive force driving winding 75 is equivalent to the total magnetomotive force $\theta$ of FIGURE 2.

Assuming now that the restricted cross-sectional area of magnetic section 73 is normally saturated and has an induction similar to induction curve B of FIGURE 2 for armature 56, it will be seen that a voltage pulse $\mu_1$ is generated in winding 75 which begins at a time just prior to the time $t_V$ in FIGURE 2 preceding a current zero interval. This output voltage pulse may then be directly connected to the circuit breaker trip structure 12 to effect release of suitable latch means within the circuit breaker trip structure which permit the operation of circuit breaker 13 immediately prior to current zero.

FIGURE 3 illustrates a specific embodiment for carrying out the concepts illustrated in FIGURE 6.

Referring now to FIGURE 3, the magnetic core 80 is equivalent to magnetic core 71 of FIGURE 6, and has a plurality of separate air gaps 81 therein, and is surrounded by a winding 82 equivalent to winding 77 of FIGURE 6. It is this magnetic structure which generates the current $i_2$ previously considered in FIGURE 1.

The second magnetic structure 83 is provided with a plurality of air gaps 84 along with a single smaller air gap 85 where the gap 85 is equivalent to gap 52 of FIGURE 1, while the gaps 84 are equivalent to gaps 51 of FIGURE 1.

It is to be noted that the magnetic structure 83 of FIGURE 3 (as well as the magnetic core 50 of FIGURE 1 and core 80 of FIGURE 3) is formed of a plurality of stacked laminations. In the case of core 83, however, the gaps 84 are formed of partial cuts through the core laminations with each lamination being a single member joined by small webs at the end of each cut defining an air gap.

Each of the central laminations forming core 83 then has two generally rectangular cut-out sections 86 and 87 which define a central web 88 of magnetic material on which two windings 89 and 90 are coaxially wound. The windings 89 and 90 are equivalent to windings 74 and 75 of FIGURE 6. That is to say, the terminals of winding 89 are connected to the terminals of winding 82 on core 80, while the terminals of winding 90 are taken out to some suitable set of terminals 91 and 92 with a pulse being developed at these terminals immediately prior to each current zero for the current $i_1$.

The arrangement of windings 89 and 90 on web 88 of FIGURE 3 can be modified in the manner illustrated in FIGURE 4 which illustrates the placement of a generally rectangular opening in the laminations and which spans the air gap 85. A magnetic bobbin having magnetic side plates 100 and 101 with a connecting central core 102 then has the windings 89 and 90 wound thereon with the bobbin inserted in the generally rectangular opening in the laminations. This will provide the same effective magnetic circuit as that illustrated in FIGURE 3. Moreover, the air gap will be rigidly maintained by the dimensions of the magnetic bobbin.

In operation, it will be apparent that the total magnetomotive force in the web 88 of FIGURE 3 (or core 102 of FIGURE 4) will be given by the ratio of air gap 85 to the total air gap defined by gaps 84.

In addition, and in order to produce the current $i_2$, the further air gap transformer 80 having $n$ equal gaps 81, will also be excited by the main current $i_1$. The total air gap spacings of the two transformers 80 and 83 are so selected in the embodiment of FIGURE 3 that no saturation phenomena occur in the region of the pre-release time $t_V$ of FIGURE 2. Thus, during this critical interval, a flux will pass through web 88 which is in phase with current $i_1$ caused by the effective magnetomotive force $\theta_1$. Moreover, winding 89 will carry a current $i_2$ derived from winding 82 of core 80, thereby imparting a further magnetomotive force $\theta_2$ which is equal to $i_2$ times the number of turns of winding 89.

Accordingly, an output voltage will be induced in winding 90 by the total effective magnetomotive force $\theta$ with the web 88 unsaturating at approximately the beginning of interval $t_V$.

In the circuit shown in FIGURE 3, it will be noted that a resistor $R_Z$ equivalent to resistor $R_Z$ of FIGURE 1 is connected in the series connection between windings 82 and 89. In addition, a capacitor 103 is connected in parallel with resistor $R_Z$.

The arrangement of FIGURE 3 provides improved operation as compared to the arrangement of FIGURE 1 in that the magnetic web 88 is disposed within the magnetic circuit of core 83, thereby being unaffected by stray magnetic fields of adjacent phases. Moreover, the web 88 (or the web 102 of FIGURE 4) can have a relatively small cross-sectional area with respect to the cross-section of the core 88 so that the web will be saturated even for relatively small resultant magnetomotive forces $\theta$.

Note that where the arrangement of FIGURE 4 is used, highly saturable nickel-iron alloys can be used for the core 102 to obtain a relatively sharp change in induction for a small change in magnetomotive force.

Moreover, and with the arrangement of FIGURE 3, and since a separate air gap transformer 80 is used, the secondary ampere turns $i_2N_2$ will not produce any additional phase shift in the total flux of core 83, and thus a phase shift in the magnetomotive force $\theta_1$, as would exist in the arrangement of FIGURE 1. Therefore, the magnetomotive force $\theta_1$ will be directly in phase with the current $i_1$ of FIGURE 2.

By connecting the capacitor 103 in parallel with resistance $R_Z$, it is possible to compensate for any phase shift of current $i_2$ with respect to the voltage producing the current $i_2$ which was caused by the inductance of the secondary circuit. Moreover, the use of the capacitor 103 is of particular importance in connection with the synchronous interruption of short half-waves since a half-wave of a duration, for example, of only 5 milliseconds (in a 50 cycle per second system) will have approximately the same effect in this system as a current of double the frequency of the normal power line frequency. Therefore, the capacitor 103 will have a substantially greater effect in the case of short half-waves than in the case of symmetrical half-waves, whereby a reduction of the pre-release time $t_{V0}$ in the case of short half-waves can be prevented.

Clearly, the parallel capacitance arrangement can also be applied to the embodiment of FIGURE 1 with capacitor in parallel with resistor $R_Z$.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A signal generating system for generating a signal prior to the passage of zero current in a conductor; said signal current system comprising magnetic core means encircling said conductor, a relatively small air gap extending across said magnetic core means, a relatively large air gap extending across said magnetic core means, a magnetic circuit connected in parallel with said relatively small air gap, auxiliary winding means wound on said magnetic circuit and toroidal winding means wound on said magnetic core means, a resistor, and signal output means connected to said magnetic circuit for generating an output signal responsive to a change in flux in said magnetic circuit; said auxiliary winding means, said toroidal winding and said resistor connected in series; the magnetomotive forces across said relatively small air gap due to the flux in said magnetic core being in phase with the current through said conductor; the magnetomotive force induced in said magnetic circuit by said auxiliary winding means being in quadrature with the current through said conductor whereby the net magnetomotive force around said magnetic circuit passes through zero prior to the passage of current in said conductor through zero whereby the flux of said magnetic circuit reverses prior to passage of zero current through said conductor.

2. The system substantially as set forth in claim 1 wherein the cross-sectional area of said magnetic circuit is approximately 10% of the cross-sectional area of said magnetic core means.

3. The system substantially as set forth in claim 1 which further includes a capacitor connected in parallel with said resistor.

4. The system substantially as set forth in claim 1 wherein said relatively large air gap comprises a plurality of symmetrically disposed identical air gaps distributed around said magnetic core means.

5. The system substantially as set forth in claim 1 wherein said magnetic core means includes a first and second magnetic core encircling said conductor; said first magnetic core having said toroidal windings wound thereon and including said relatively large air gap; said second magnetic core having therein said relatively large and relatively small air gaps and said magnetic circuit in parallel with said relatively small air gap.

6. The system substantially as set forth in claim 1 wherein said auxiliary winding means includes first and second coaxial windings.

7. The system substantially as set forth in claim 1 wherein said magnetic circuit includes first and second spaced magnetic poles straddling said relatively small air gap and an armature disposed between the ends of said first and second magnetic poles forming said signal output means; said armature movable between a sealed position with respect to said first and second magnetic poles and removed position with respect to said first and second magnetic poles; a plunger connected to said armature and spring biasing means connected to said plunger to bias said plunger toward said removed position of said armature; said armature having a magnetic cross-section of the order to 10% of the cross-section of said magnetic core means and being normally magnetically saturated until just prior to a current zero in said conductor whereupon the flux through said armature begins to reverse and said spring biasing means moves said armature from its said sealed position to its said released position.

8. The system substantially as set forth in claim 1 wherein said magnetic circuit means includes a magnetic web extending across the said relatively small air gap; said magnetic web having a cross-section of approximately 10% of the cross-section of said magnetic core means.

9. The system substantially as set forth in claim 5 wherein said magnetic circuit means includes a magnetic web extending across the said relatively small air gap; said magnetic web having a cross-section of approximately 10% of the cross-section of said magnetic core means.

10. The system substantially as set forth in claim 8 wherein said auxiliary winding means comprises a first and second winding wound on said web; said first winding, said toroidal winding and said resistor connected in series; said second winding comprising said signal output means and generating an output voltage prior to the passage of zero current through said conductor.

11. The system substantially as set forth in claim 9 wherein said auxiliary winding means comprises a first and second winding wound on said web; said first winding, said toroidal winding and said resistor connected in series; said second winding comprising said signal output means and generating an output voltage prior to the passage of zero current through said conductor.

References Cited by the Examiner

UNITED STATES PATENTS 3,215,866   11/1965   Kesselring _____ 307—133

MILTON O. HIRSHFIELD, *Primary Examiner.*

J. D. TRAMMELL, *Assistant Examiner.*